(12) United States Patent
Karampatsis et al.

(10) Patent No.: US 11,330,547 B2
(45) Date of Patent: May 10, 2022

(54) MOBILE NETWORK POLICY FRESHNESS

(71) Applicant: Lenovo (Singapore) PTE. LTD., New Tech Park (SG)

(72) Inventors: Dimitrios Karampatsis, Ruislip (GB); Apostolis Salkintzis, Athens (GR); Genadi Velev, Darmstadt (DE)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 71 days.

(21) Appl. No.: 16/614,593

(22) PCT Filed: Nov. 20, 2017

(86) PCT No.: PCT/EP2017/079720
§ 371 (c)(1),
(2) Date: Nov. 18, 2019

(87) PCT Pub. No.: WO2019/096418
PCT Pub. Date: May 23, 2019

(65) Prior Publication Data
US 2020/0154389 A1    May 14, 2020

(51) Int. Cl.
| | |
|---|---|
| *H04W 60/00* | (2009.01) |
| *H04L 12/24* | (2006.01) |
| *H04L 41/0893* | (2022.01) |
| *H04L 29/06* | (2006.01) |
| *H04L 65/1073* | (2022.01) |
| *H04W 48/14* | (2009.01) |

(52) U.S. Cl.
CPC ....... *H04W 60/005* (2013.01); *H04L 41/0893* (2013.01); *H04L 63/20* (2013.01); *H04L 65/1073* (2013.01); *H04W 48/14* (2013.01)

(58) Field of Classification Search
CPC ........ H04W 36/00–385; H04W 48/14; H04W 60/005; H04L 41/0893; H04L 63/20; H04L 65/1073
See application file for complete search history.

(56) References Cited

U.S. PATENT DOCUMENTS 9,198,022 B1 *  11/2015  Draznin ............... H04W 8/12
10,476,863 B1 *  11/2019  Hanlon ................ H04L 63/105
(Continued)

OTHER PUBLICATIONS

PCT/EP2017/079720, "Notification of Transmittal of the International Search Report and the Written Opinion of the International Searching Authority, or the Declaration", PCT, dated Jan. 4, 2018, pp. 1-37.

(Continued)

*Primary Examiner* — Habte Mered
*Assistant Examiner* — Prince A Mensah
(74) *Attorney, Agent, or Firm* — Kunzler Bean & Adamson

(57) ABSTRACT

Apparatuses, methods, and systems are disclosed for determining mobile network policy freshness. One method (700) includes accessing (702) a first policy associated with a first mobile network, a first policy identifier, and a freshness parameter. The method (700) includes determining (704), based on the freshness parameter, whether the first policy is fresh. The method (700) includes transmitting (706) a registration message to a second mobile network. The registration message includes the first policy identifier in response to determining that the first policy is not fresh.

20 Claims, 8 Drawing Sheets

(56) References Cited

U.S. PATENT DOCUMENTS

| | | | |
|---|---|---|---|
| 2011/0103348 A1* | 5/2011 | Hori | H04W 36/0055 370/331 |
| 2012/0023189 A1* | 1/2012 | Giaretta | H04W 48/18 709/217 |
| 2014/0295913 A1* | 10/2014 | Gupta | H04W 48/16 455/552.1 |
| 2018/0124561 A1* | 5/2018 | Hassan | H04W 4/021 |
| 2018/0270840 A1* | 9/2018 | Griot | H04W 72/10 |
| 2019/0029065 A1* | 1/2019 | Park | H04W 4/16 |
| 2019/0116529 A1* | 4/2019 | Lu | H04W 8/26 |
| 2019/0261233 A1* | 8/2019 | Duan | H04W 36/0072 |
| 2020/0077356 A1* | 3/2020 | Youn | H04W 8/065 |

OTHER PUBLICATIONS

3GPP, "3rd Generation Partnership Project; Technical Specification Group Services and System Aspects; Procedures for the 5G System; Stage 2 (Release 15)", 3GPP TS 23.502 V1.3.0, Nov. 2011, pp. 1-215.

Catt, "TS 23.502: Update registration procedure including mobility policy acquirement in the roaming case", SA WG2 Meeting #122 S2-175175, Jun. 26-30, 2017, pp. 1-6.

Lenovo Motorola Mobility, "UE Policy configuration (23.502)", SA WG2 Meeting #123 S2-177243, Oct. 23-27, 2017, pp. 1-9.

Lenovo Motorola Mobility, "UE Policy configuration (23.502)", SA WG2 Meeting #123 S2-177244, Oct. 23-27, 2017, pp. 1-7.

* cited by examiner

MOBILE NETWORK POLICY FRESHNESS

FIELD

The subject matter disclosed herein relates generally to wireless communications and more particularly relates mobile network policy freshness.

BACKGROUND

The following abbreviations are herewith defined, at least some of which are referred to within the following description: Third Generation Partnership Project ("3GPP"), Positive-Acknowledgment ("ACK"), Access and Mobility Management Function ("AMF"), Binary Phase Shift Keying ("BPSK"), Clear Channel Assessment ("CCA"), Cyclic Prefix ("CP"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Home Policy Control Function ("H-PCF"), Home Public Land Mobile Network ("HPLMN"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Non-Access Stratum ("NAS"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Policy Control Function ("PCF"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Public Land Mobile Network ("PLMN"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), Subscriber Identity Module ("SIM"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), Unified Data Management ("UDM"), User Data Repository ("UDR"), User Entity/Equipment (Mobile Terminal) ("UE"), Uplink ("UL"), Universal Mobile Telecommunications System ("UMTS"), Uplink Pilot Time Slot ("UpPTS"), Universal Subscriber Identity Module ("USIM"), Ultra-reliability and Low-latency Communications ("URLLC"), Visited Policy Control Function ("V-PCF"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, a policy stored by a remote unit may be outdated. In such networks, a base unit may not be aware that the policy stored by the remote unit is outdated.

BRIEF SUMMARY

Methods for determining mobile network policy freshness are disclosed. Apparatuses and systems also perform the functions of the apparatus. In one embodiment, the method includes accessing a first policy associated with a first mobile network, a first policy identifier, and a freshness parameter. In various embodiments, the method includes determining, based on the freshness parameter, whether the first policy is fresh. In certain embodiments, the method includes transmitting a registration message to a second mobile network. In such embodiments, the registration message includes the first policy identifier in response to determining that the first policy is not fresh.

In one embodiment, the first policy identifier indicates a version of the first policy. In a further embodiment, the freshness parameter indicates a date to check for a new policy, an expiration date for the first policy, a date the first policy is received, or some combination thereof. In certain embodiments, the method includes determining to register with the second mobile network. In such embodiments, transmitting the registration message to the second mobile network is performed in response to determining to register with the second mobile network. In various embodiments, registering with the second mobile network includes initially registering with the second mobile network.

In some embodiments, registering with the second mobile network includes registering with the second mobile network to update a location of a remote unit. In various embodiments, the method includes determining that there is no policy associated with the second mobile network and, in response to determining that there is no policy, transmitting the registration message with a policy identifier set to zero. In one embodiment, the method includes determining whether there is a second policy corresponding to the second mobile network and, in response to determining that there is no second policy and that the first policy is fresh, transmitting the registration message with a policy identifier set to zero. In certain embodiments, the method includes receiving a message following successful registration. In such embodiments, the message includes a new policy. In various embodiments, the method includes receiving a message following successful registration. In such embodiments, the message includes a new freshness parameter for the first policy.

In certain embodiments, the method includes determining whether a remote unit is roaming. In various embodiments, the method includes receiving a message following successful registration. In such embodiments, the message includes a new policy from the first mobile network. In one embodiment, the method includes, in response to determining that the policy is not fresh, continuing to use the policy. In certain embodiments, the first mobile network is the same as the second mobile network. In various embodiments, the first mobile network is different from the second mobile network.

An apparatus for determining mobile network policy freshness, in one embodiment, includes a processor that: accesses a first policy associated with a first mobile network, a first policy identifier, and a freshness parameter; and determines, based on the freshness parameter, whether the first policy is fresh. In various embodiments, the apparatus includes a transmitter that transmits a registration message to a second mobile network. In such embodiments, the registration message includes the first policy identifier in response to determining that the first policy is not fresh.

In one embodiment, a method for updating a policy includes receiving a first message from a remote unit, the first message including a first policy identifier associated with a first policy. In various embodiments, the method includes determining, based on the first policy identifier, whether the first policy is to be updated. In certain embodiments, the method includes transmitting a second message to the remote unit, the second message including a second policy, a second policy identifier, and a freshness parameter. In such embodiments, the second message is transmitted in response to determining that the first policy is to be updated, and the freshness parameter includes information that indicates a date that the second policy is to be updated.

In one embodiment, determining, based on the first policy identifier, whether the policy is to be updated, includes transmitting the first policy identifier to a home mobile network and receiving information from the home mobile network that indicates whether the policy is to be updated and an indication of a date that new policy data is to be requested in a subsequent registration request. In a further embodiment, the information includes the second policy with the freshness parameter associated with the second policy. In certain embodiments, determining, based on the first policy identifier, whether the first policy is to be updated, includes comparing the first policy identifier of the first policy to the second policy identifier.

In some embodiments, the method includes transmitting a third message to the remote unit. In such embodiments, the third message includes an indication of a date that new policy data is to be requested in a subsequent registration request in response to determining that the first policy is not to be updated.

An apparatus for updating a policy, in one embodiment, includes a receiver that receives a first message from a remote unit, the first message including a first policy identifier associated with a first policy. In various embodiments, the apparatus includes a processor that determines, based on the first policy identifier, whether the first policy is to be updated. In some embodiments, the apparatus includes a transmitter that transmits a second message to the remote unit, the second message including a second policy, a second policy identifier, and a freshness parameter. In such embodiments, the second message is transmitted in response to determining that the first policy is to be updated, and the freshness parameter includes information that indicates a date that the second policy is to be updated.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
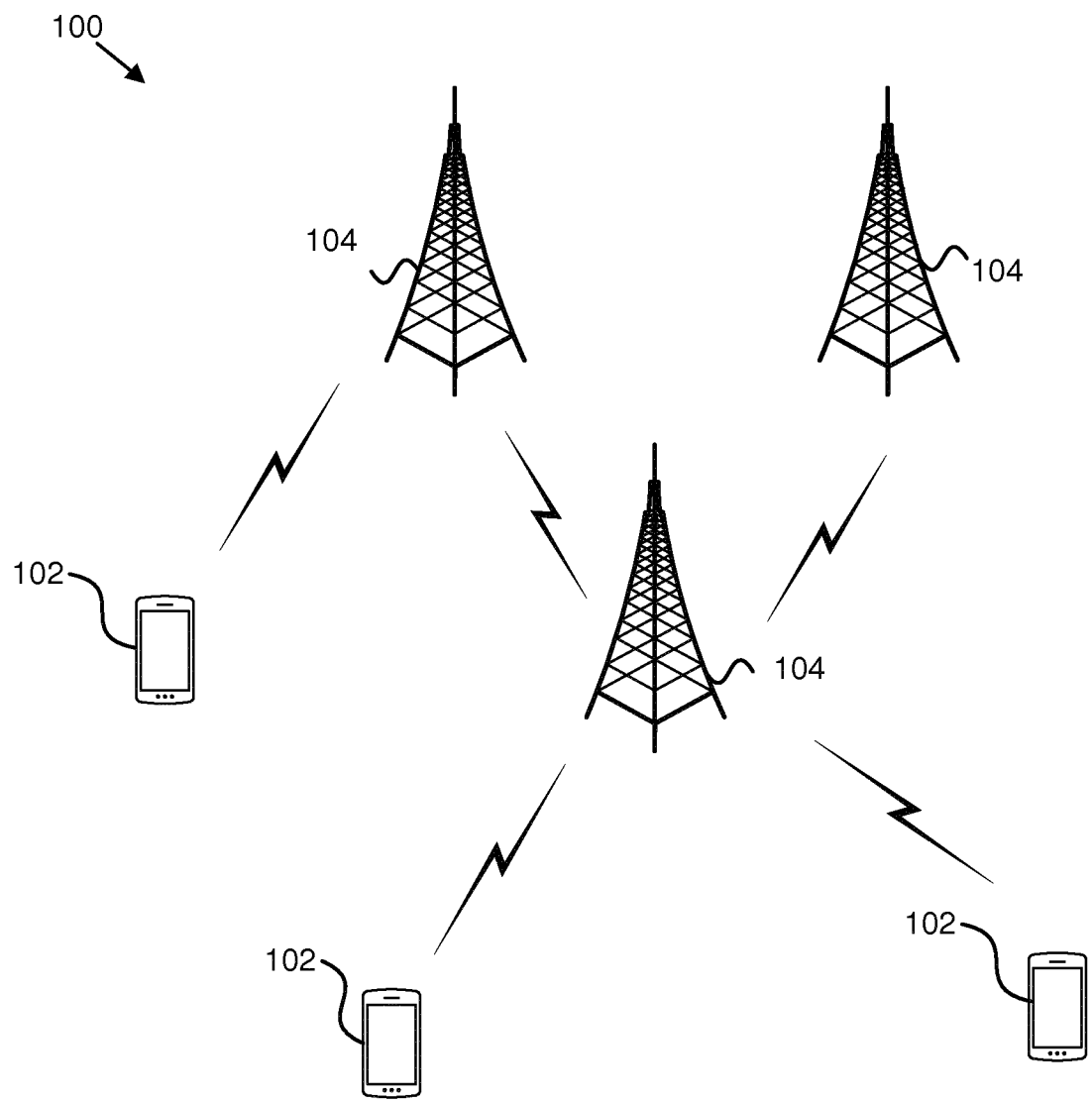
FIG. 1 is a schematic block diagram illustrating one embodiment of a wireless communication system for determining mobile network policy freshness.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining mobile network policy freshness. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. In some embodiments, a base unit 104 may include one or more of the following network components a gNB, an AMF, a PCF, a UDR, and/or a UDM.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In certain embodiments, a remote unit 102 may access a first policy associated with a first mobile network, a first policy identifier, and a freshness parameter. The remote unit 102 may determine, based on the freshness parameter, whether the first policy is fresh. In some embodiments, the remote unit 102 may transmit a registration message to a second mobile network. In such embodiments, the registration message includes the first policy identifier in response to determining that the first policy is not fresh. Accordingly, a remote unit 102 may be used for determining mobile network policy freshness.

In various embodiments, a base unit 104 may receive a first message from a remote unit, the first message including a first policy identifier associated with a first policy. The base unit 104 may determine, based on the first policy identifier, whether the first policy is to be updated. In some embodiments, the base unit 104 may transmit a second message to the remote unit, the second message including a second policy, a second policy identifier, and a freshness parameter. In such embodiments, the second message is transmitted in response to determining that the first policy is to be updated, and the freshness parameter includes information that indicates a date that the second policy is to be updated. Accordingly, a base unit 104 may be used for updating a policy.

Figure 2:
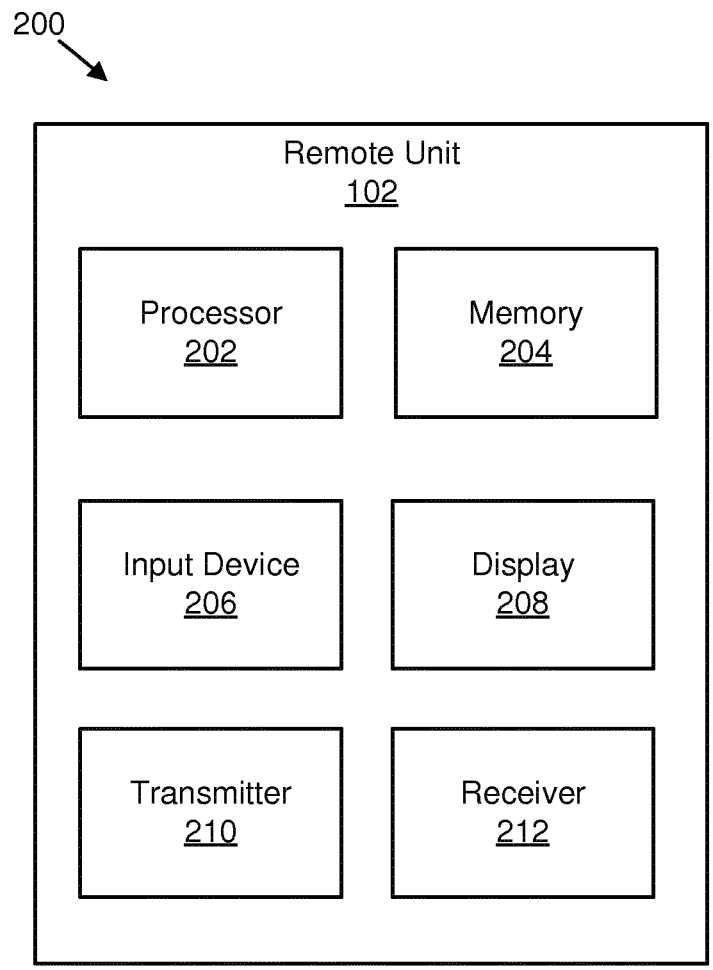
FIG. 2 is a schematic block diagram illustrating one embodiment of an apparatus that may be used for determining mobile network policy freshness.

FIG. 2 depicts one embodiment of an apparatus 200 that may be used for determining mobile network policy freshness. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 accesses a first policy associated with a first mobile network, a first policy identifier, and a freshness parameter. In certain embodiments, the processor 202 determines, based on the freshness parameter, whether the first policy is fresh. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to policies. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the transmitter 210 is used to transmit a registration message to a second mobile network. In such embodiments, the registration message includes the first policy identifier in response to determining that the first policy is not fresh. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
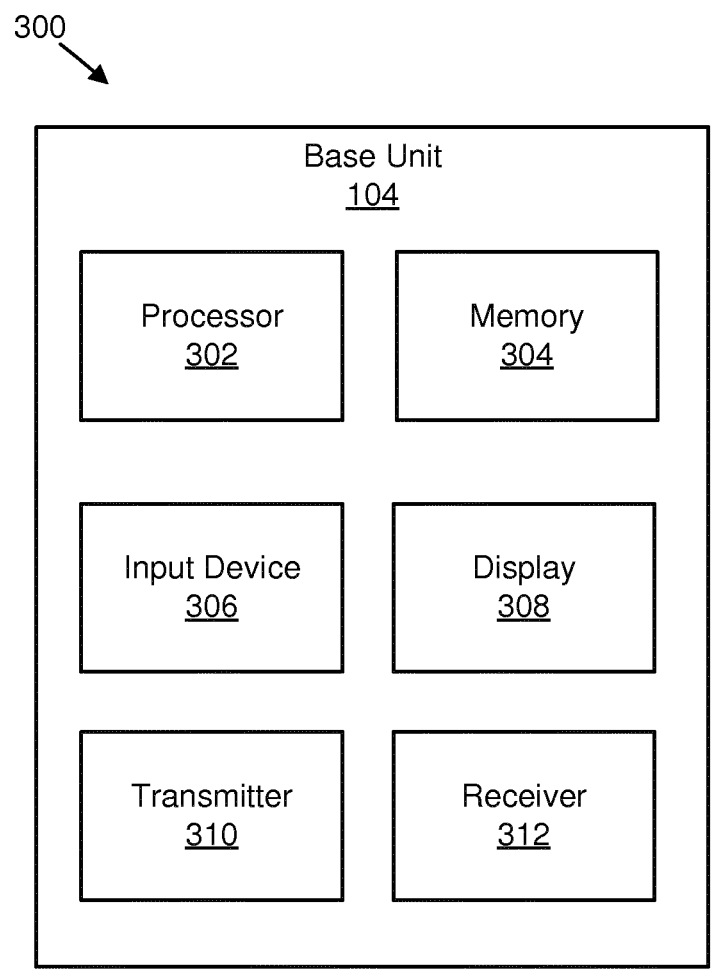
FIG. 3 is a schematic block diagram illustrating one embodiment of an apparatus that may be used for updating a policy.

FIG. 3 depicts one embodiment of an apparatus 300 that may be used for updating a policy. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 is used to receive a first message from a remote unit 102, the first message including a first policy identifier associated with a first policy. In some embodiments, the processor 302 is used to determine, based on the first policy identifier, whether the first policy is to be updated. In certain embodiments, the transmitter 310 is used to transmit a second message to the remote unit 102, the second message including a second policy, a second policy identifier, and a freshness parameter. In such embodiments, the second message is transmitted in response to determining that the first policy is to be updated, and the freshness parameter includes information that indicates a date that the second policy is to be updated. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, a remote unit 102 policy may be sent by a PCF to the remote unit 102. The policy may include policy data, a freshness parameter (e.g., freshness indicator), and/or a policy identifier. In various embodiments, the freshness parameter may indicate a date to check for a new policy, an expiration date for a policy, and/or a data a policy is received. For example, the freshness parameter may indicate that a policy is fresh for the next 2 weeks, fresh until Nov. 25, 2017, and/or fresh forever. In some embodiments, the policy identifier may be any suitable value chosen by a network (e.g. 108473) and may identify a certain policy. In one embodiment, the policy identifier may indicate a version of the policy and/or a type of policy. In such embodiments, each time a particular policy is updated, the version of the policy may change so that by analyzing the version of the policy it may be determined whether the policy is the latest policy.

In some embodiments, the remote unit 102 may receive policies from a HPLMN and/or from one or more VPLMNs. Accordingly, in certain embodiments, the remote unit 102 may have multiple policies (e.g., a HPLMN policy and/or multiple VPLMN policies). In various embodiments, a HPLMN policy may include: HPLMN policy data, an HPLMN policy identifier ("ID"), and/or a HPLMN freshness parameter. Moreover, in some embodiments, a VPLMN policy may include: VPLMN policy data, a VPLMN policy identifier, and/or a VPLMN freshness parameter.

In certain embodiments, at a time in which a remote unit 102 registers with a PLMN and the remote unit 102 has fresh policy (e.g., a date corresponding to the freshness parameter has not been reached, a time period corresponding to the freshness parameter has not elapsed, etc.) for the PLMN that the remote unit 102 is registering with, the remote unit 102 does not need to include anything new in a registration request message.

In various embodiments, at a time in which a remote unit 102 registers with a PLMN and the remote unit 102 does not have a fresh policy (e.g., a date corresponding to the freshness parameter has been reached, a time period corresponding to the freshness parameter has elapsed, etc.) for the PLMN that the remote unit 102 is registering with, the remote unit 102 includes a policy identifier in a registration request message. Moreover, in such embodiments, an AMF notifies a PCF of the policy identifier and the PCF determines (e.g., based on the policy identifier) whether a new policy should be provided to the remote unit 102. In response to there being a new policy, the PCF sends the new policy with a new policy identifier and a new freshness parameter to the AMF so the new policy with the new policy identifier and the new freshness parameter can be sent to the remote unit 102. In some embodiments, in response to there not being a new policy, the PCF sends only a new freshness parameter corresponding to the policy identifier.

In certain embodiments, the freshness parameter may be used in roaming situations. For example, at a time in which a remote unit 102 registers with a VPLMN, and the remote unit 102 has a stored policy from this VPLMN, the remote unit 102 may determine whether the stored policy is fresh. In some embodiments, a stored policy without a freshness parameter may indicate that the stored policy is always fresh, and/or may trigger a check to determine whether there is a new policy.

In some embodiments, such as with a new device, the new device may determine that an existing policy is not fresh and may send a registration request message with a policy identifier to trigger the network to determine whether a new policy exists for the new device.

In various embodiments, a policy identifier equal to 0 may correspond to a special policy identifier value indicating that a remote unit 102 does not have a policy. In certain embodiments, such as with a new device and/or in response to a user performing a factory reset, the device may send a registration request message with a policy identifier equal to 0. Furthermore, in some embodiments, in response to a device entering a VPLMN for a first time, the device may send a registration request message with a policy identifier equal to 0.

In certain embodiments, a PCF may subscribe with an AMF to receive notifications every time a remote unit 102 includes a policy identifier in a registration request message. In some embodiments, an AMF may provide a policy identifier to a PCF using a remote unit 102 context establishment and modification procedure and/or a dedicated service request procedure, in response to the remote unit 102 including a policy identifier in a registration request message and the AMF being configured to notify the PCF when a policy identifier is included in the registration request message.

In various embodiments, in response to the remote unit 102 sending a registration request message with a policy identifier but not receiving a message from a PCF (e.g., not receiving a new policy, not receiving a new freshness parameter), the remote unit 102 may determine that the network does not support policies and may not include a policy identifier in future registration request messages.

In various embodiments, in response to the remote unit 102 sending a registration request message with a policy identifier and receiving a message from a PCF including only a new freshness parameter but no new policy identifier, the remote unit 102 may determine that the existing policy data in the remote unit 102 will be up to date until the new date provided within the new freshness parameter.

In certain embodiments, in response to the remote unit 102 roaming and determining that its HPLMN policy is no longer fresh, the next registration request message may include a HPLMN policy identifier, which may trigger an AMF to notify a V-PCF and the V-PCF to notify a H-PCF that the HPLMN policy is no longer fresh.

Figure 4:
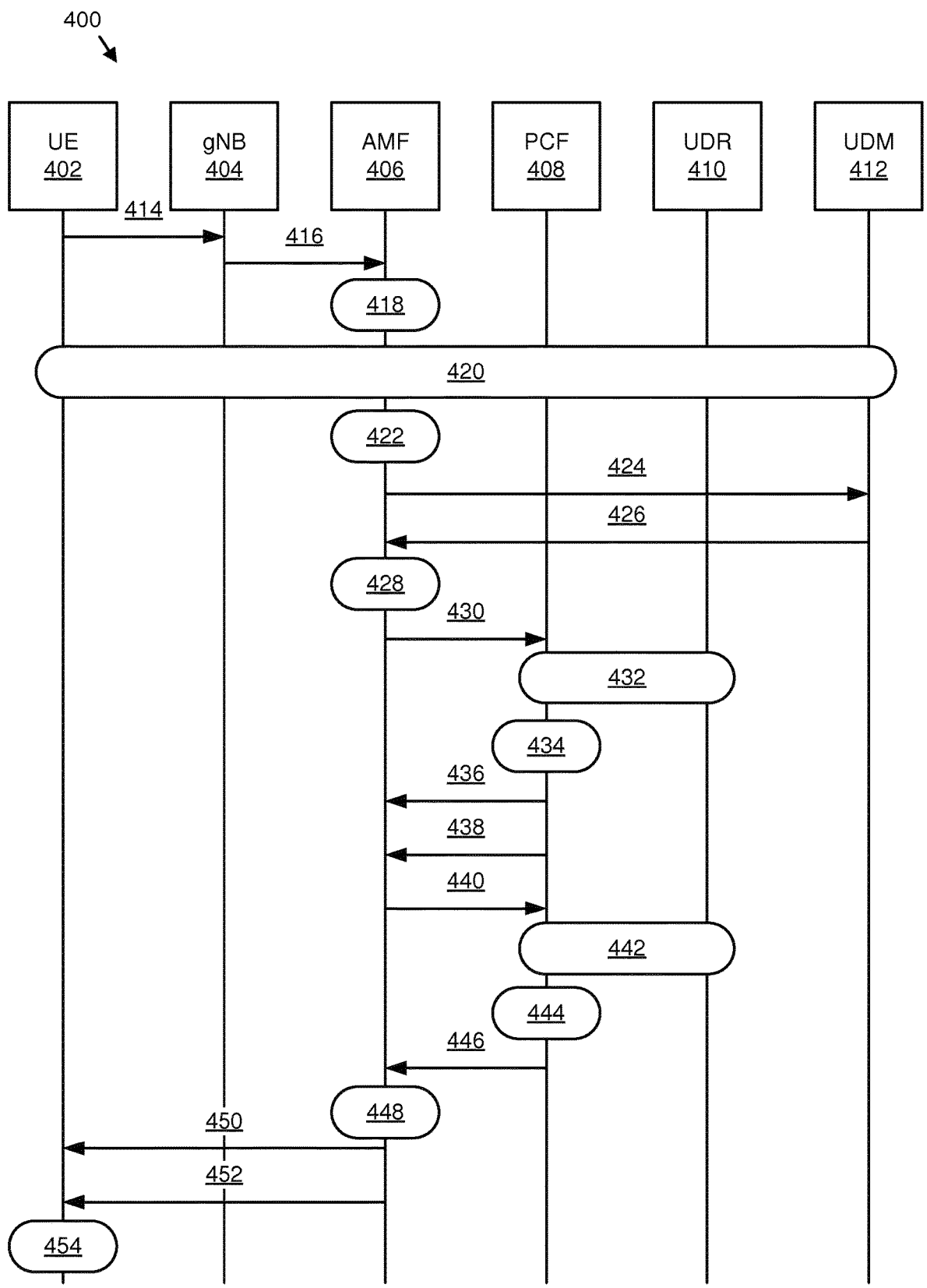
FIG. 4 illustrates one embodiment of communications for updating a policy.

FIG. 4 illustrates one embodiment of communications 400 for updating a policy, such as in response to a UE not roaming. Specifically, communications 400 between a UE 402, a gNB 404, an AMF 406, a PCF 408, a UDR 410, and a UDM 412 are illustrated.

In some embodiments, a first communication 414 from the UE 402 to the gNB 404 may include a registration request message in response to the UE 402 determining that the registration request message is to be sent. In certain embodiments, the UE 402 may determine, at a time in which a registration request message is needed to be sent, that UE 402 policies have expired or the UE 402 has no UE policies in a current PLMN. In various embodiments, the UE 402 may include an HPLMN policy identifier as part of the registration request message. The HPLMN policy identifier may provide information corresponding to the current UE 402 policies installed at the UE 402. In some embodiments, the UE 402 may include a policy identifier in one or more of the following situations: the UE 402 has received policies but the policies are considered out-of-date (e.g., according to the freshness parameter); the UE 402 has not received policies (e.g., in this situation the policy identifier is included and set to zero); the UE 402 has erased (e.g., cleared) received policies (e.g., due to a factory reset) (e.g., in this situation the policy identifier is included and set to zero); and in response to a SIM card (or USIM cart) being inserted into a new UE 402. In certain embodiments, the UE 402 may track a SIM card currently in use and compare it with a previously used SIM Card. For example, the UE 402 may determine whether a new SIM card is inserted by comparing a new SIM card number with an old SIM card number.

In various embodiments, UE 402 policy information (e.g. policy identifier, freshness parameter, policy descriptor, etc.) may be included (or encapsulated) in an NAS mobility management registration request message as container information transparent to the AMF 406 (e.g., denoted as an N1 PCF (or N1 policy control and charging "PCC" or similar named) container). In such embodiments, the AMF 406 may identify the N1 PCF container and forwards it to the PCF 408 via a service based request message. In other words, the N1 PCF information may be forwarded transparently from the UE 402 to the PCF 408 and the PCF 408 may process the N1 PCF information. In some embodiments, the N1 PCF information may include a policy identifier and/or a freshness parameter, but may also include a policy descriptor (e.g., the UE 402 policy includes Access Network Discovery and Selection Policies "ANDSP", but no UE Routing Selection Policies "URSP"; the UE 402 policy contains URSP— such as DNN Selection Policy "DNNSP" and/or SSC Mode Selection Policy "SSCMSP"—which indicates that Network Slice Selection Policy "NSSP" is not contained). In certain embodiments, the N1 PCF information may include a request for a UE 402 policy (e.g., if the UE 402 has determined that an old UE 402 policy is missing or was deleted).

In various embodiments, a second communication 416 from the gNB 404 to the AMF 406 includes a forward of the registration request message transmitted from the UE 402. In certain embodiments, the AMF 406 carries out AMF selection 418, such as carrying out AMF selection 418 as specified in 3GPP TS 23.502. In various embodiments, authentication and security 420 is performed, such as performing authentication and security 420 as specified in 3GPP TS 23.502. In some embodiments, the AMF 406 performs UDM selection 422, such as performing UDM selection 422 as specified in 23.502.

In a third communication 424 from the AMF 406 to the UDM 412 and/or a fourth communication 426 from the UDM 412 to the AMF 406, the AMF 406 retrieves a subscription profile from the UDM 412. In various embodiments, the AMF 406 determines 428 whether the PCF 408 is to be contacted. In certain embodiments, the AMF 406 determines that the PCF 408 is to be contacted in response to: the UE 402 performing an initial registration and including a policy identifier; and/or the PCF 408 has subscribed to the AMF 406 to be notified in response to the UE 402 including a policy identifier.

In some embodiments, the AMF 406 contacts the PCF 408 via a first option (e.g., via a UE 402 context establishment and/or modification procedure and/or via a dedicated service request message transmitted to the PCF 408) and/or via a second option (e.g., via an AMF 406 subscriber notification procedure).

The first option is described in relation to communications 430 through 436. In the first option the AMF 406 may be configured to invoke a service request message to the PCF 408 in response to the UE 402 including a policy identifier and/or a freshness parameter in the registration request message and/or in response to policy information being sent in an N1 PCF container from the UE 402.

In a fifth communication 430 from the AMF 406 to the PCF 408, the AMF 406 initiates a UE context establishment and/or modification procedure (e.g., see section 4.16 of 23.502) by transmitting a message to the PCF 408 invoking the Npcf_AMPolicy_Get procedure and/or transmits a generic service request message to the PCF 408. In various embodiments, the AMF 406 includes in the service request the policy identifier provided by the UE 402 in the registration request message. In some embodiments, the AMF 406 forwards N1 PCF information to the PCF 408 (e.g., instead of invoking the Npcf_AMPolicy_Get procedure). Forwarding the N1 PCF information to the PCF 408 may be performed by, in some embodiments, Npcf_N1-Message-Communication service or Namf_Notification service between the AMF 406 and the PCF 408.

In various embodiments, the PCF 408 may obtain 432 from the UDR 410 the latest policy information for the UE 402 (e.g., subscriber). In certain embodiments, the PCF 408 may: forward the UE 402 policy information (e.g., contained in the N1 PCF container) received from the UE 402 to the UDR 410; or the PCF 408 may request download and/or retrieval of the UE 402 policy. In some embodiments, based on the UE 402 policy information (e.g., contained in the N1 PCF container) and received from the PCF 408, the UDR 410 may determine whether to initiate a UE 402 policy update to the UE 402 (e.g., to send or to push the UE 402 policy) or to generate a new or updated policy and to send it to the UE 402. In various embodiments, in response to the UDR 410 determining to update the UE 402 policy, the UDR 410 sends the UE 402 policy to the PCF 408 as a response to the indication from PCF 408. In certain embodiments, the UDR 410 may indicate to delete the UE 402 policy by the UDR 410 sending a "policy delete" command to the UE 402. In some embodiments, in response to the UDR 410 determining that no UE 402 policy update is needed, the UDR 410 may reply to the PCF 408 with information indicating that no policy update is needed. In various embodiments, the UDR 410 may indicate to delete a whole UE 402 policy or a part of the UE 402 policy. In such embodiments, the UDR 410 may send a "policy delete" command to the UE 402 including further information (e.g., which part of the policy is to be deleted).

In one embodiment, the PCF 408 determines 434 whether one or more new UE 402 policies are required to be delivered to the UE 402 based on the information provided by the UDR 410.

In a sixth communication 436 from the PCF 408 to the AMF 406, the PCF 408 may provide the updated policies in a service request response and/or by triggering a new service towards the AMF 406 (e.g., Namf_N1Communication). In the sixth communication 436, the PCF 408 may include a new policy identifier and/or a freshness parameter along with the UE 402 policy. In various embodiments, the UE 402 policy and corresponding parameters (e.g., policy identifier and/or freshness parameter) may be sent within a N1 PCF container to the AMF 406. This may be performed as reply to the fifth communication 430 or as an independent service procedure triggered by the PCF 408 towards the AMF 406. In some embodiments, such as in response to the UE 402 policy (and optionally parameters like the policy identifier and/or the freshness parameter) coming from the UDR 410, the policy and/or optional parameters may be transparent to the PCF 408.

The second option is described in relation to communications 438 through 446. In the second option the PCF 408 is subscribed to the AMF 406 to be notified in response to a UE 402 including a policy identifier and/or freshness parameters in the registration request message.

In a seventh communication 438 from the PCF 408 to the AMF 406, the PCF 408 may optionally subscribe from the AMF 406 to be notified of a change in a UE 402 policy. In an eighth communication 440 from the AMF 406 to the PCF 408, in response to the PCF 408 being subscribed from the AMF 406 to be notified of a change of UE 402 policy, the AMF 406 notifies the PCF 408 of the policy identifier included within the registration request message from the UE 402. In certain embodiments, the PCF 408 may obtain 442 from the UDR 410 the latest policy information for the UE 402 (e.g., subscriber). In one embodiment, the PCF 408 determines 444 whether one or more new UE 402 policies are required to be delivered to the UE 402 based on the information provided by the UDR 410.

In a ninth communication 446 from the PCF 408 to the AMF 406, the PCF 408 may provide the updated policies in a service request response. The PCF 408 may include a new policy identifier and/or a freshness parameter. In various embodiments, the AMF 406 may detect 448 that a new UE 402 policy is to be sent to the UE 402. The AMF 406 may store the UE 402 policy and/or forward it to the UE 402 in response to the UE 402 entering a connected state.

In a tenth communication 450 from the AMF 406 to the UE 402, the AMF 406 sends a registration accept message, such as by sending a registration accept message as defined in 3GPP TS 23.502. In an eleventh communication 452 from the AMF 406 to the UE 402, the AMF 406 may detect that the UE 402 enters a connected state and the AMF 406 may send the UE 402 policy to the UE 402, such as by sending the UE 402 policy in a generic NAS transport message. The UE 402 may store 454 the updated UE 402 policy and update its UE 402 policy identifier and/or a freshness parameter.

Figure 5:
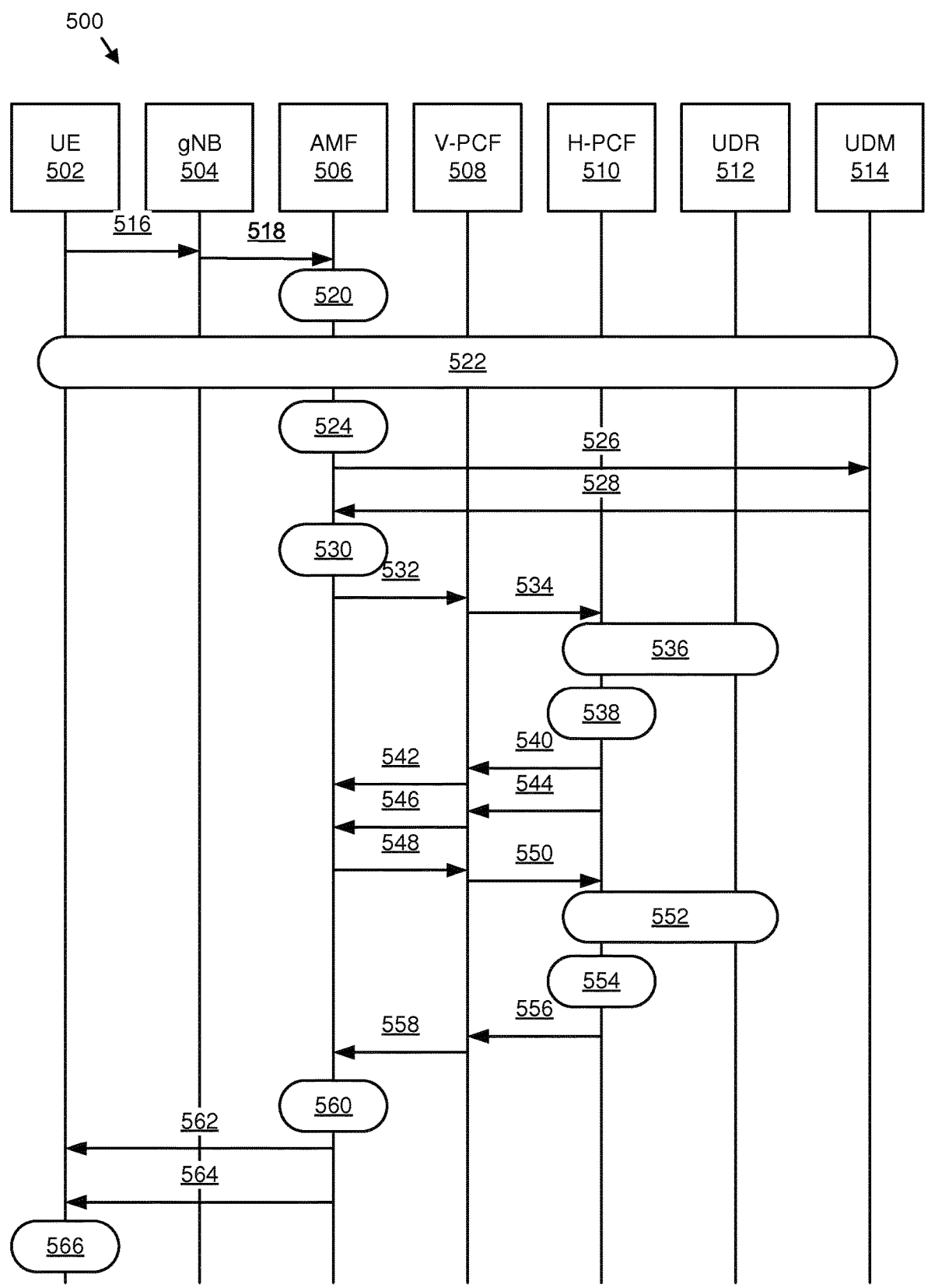
FIG. 5 illustrates another embodiment of communications for updating a policy.

FIG. 5 illustrates another embodiment of communications 500 for updating a policy, such as in response to a UE roaming. Specifically, communications 500 between a UE 502, a gNB 504, an AMF 506, a V-PCF 508, an H-PCF 510, a UDR 512, and a UDM 514 are illustrated.

In some embodiments, a first communication 516 from the UE 502 to the gNB 504 may include a registration request message in response to the UE 502 determining that the registration request message is to be sent. In certain embodiments, the UE 502 may determine that a registration request message is needed because UE 502 policies have expired or the UE 502 has no UE policies in a current PLMN. In various embodiments, the UE 502 may include an HPLMN policy identifier as part of the registration request message. The HPLMN policy identifier may provide information corresponding to the current UE 502 policies installed at the UE 502. In some embodiments, the UE 502 may include a policy identifier in one or more of the following situations: the UE 502 has received policies but the policies are considered out-of-date (e.g., according to the freshness parameter); the UE 502 has not received policies (e.g., in this situation the policy identifier is included and set to zero); the UE 502 has erased (e.g., cleared) received policies (e.g., due to a factory reset) (e.g., in this situation the policy identifier is included and set to zero); and in response to a SIM card (or USIM cart) being inserted into a new UE 502. In certain embodiments, the UE 502 may track a SIM card currently in use and compare it with a previously used SIM Card. For example, the UE 502 may determine whether a new SIM card is inserted by comparing a new SIM card number with an old SIM card number.

In various embodiments, UE 502 policy information (e.g. policy identifier, freshness parameter, policy descriptor, etc.) may be included (or encapsulated) in an NAS mobility management registration request message as container information transparent to the AMF 506 (e.g., denoted as an N1 PCF (or N1 policy control and charging "PCC" or similar named) container). In such embodiments, the AMF 506 may identify the N1 PCF container and forwards it to the V-PCF 508 via a service based request message. In other words, the N1 PCF information may be forwarded transparently from the UE 502 to the V-PCF 508 and the V-PCF 508 may process the N1 PCF information. In some embodiments, the N1 PCF information may include a policy identifier and/or a freshness parameter, but may also include a policy descriptor (e.g., the UE 502 policy includes ANDSP, but no URSP; the UE 502 policy contains URSP—such as DNNSP and/or SSCMSP—which indicates that NSSP is not contained). In certain embodiments, the N1 PCF information may include a request for a UE 502 policy (e.g., if the UE 502 has determined that an old UE 502 policy is missing or was deleted).

In various embodiments, a second communication 518 from the gNB 504 to the AMF 506 includes a forward of the registration request message transmitted from the UE 502. In certain embodiments, the AMF 506 carries out AMF selection 520, such as carrying out AMF selection 520 as specified in 3GPP TS 23.502. In various embodiments, authentication and security 522 is performed, such as performing authentication and security 522 as specified in 3GPP TS 23.502. In some embodiments, the AMF 506 performs UDM selection 524, such as performing UDM selection 524 as specified in 23.502.

In a third communication 526 from the AMF 506 to the UDM 514 and/or a fourth communication 528 from the UDM 514 to the AMF 506, the AMF 506 retrieves a subscription profile from the UDM 514. In various embodiments, the AMF 506 determines 530 whether the V-PCF 508 is to be contacted. In certain embodiments, the AMF 506 determines that the V-PCF 508 is to be contacted in response to: the UE 502 performing an initial registration and including a policy identifier; and/or the V-PCF 508 has subscribed to the AMF 506 to be notified in response to the UE 502 including a policy identifier.

In some embodiments, the AMF 506 contacts the V-PCF 508 via a first option (e.g., via a UE 502 context establishment and/or modification procedure and/or via a dedicated service request message transmitted to the V-PCF 508) and/or via a second option (e.g., via an AMF 506 subscriber notification procedure). In the first and second options, the V-PCF 508 forwards the request to the H-PCF 510.

The first option is described in relation to communications 532 through 542. In the first option the AMF 506 may be configured to send a service request message to the V-PCF 508 in response to the UE 502 including a policy identifier and/or a freshness parameter in the registration request message and/or in response to policy information being sent in an N1 PCF container from the UE 502.

In a fifth communication 532 from the AMF 506 to the V-PCF 508, the AMF 506 initiates a UE context establishment and/or modification procedure (e.g., see section 4.16 of 23.502) by transmitting a message to the V-PCF 508 invoking the Npcf_AMPolicy_Get procedure and/or transmits a generic service request message to the V-PCF 508. In various embodiments, the AMF 506 includes in the service request the policy identifier provided by the UE 502 in the registration request message. In some embodiments, the AMF 506 forwards N1 PCF information to the V-PCF 508 (e.g., instead of invoking the Npcf_AMPolicy_Get procedure). Forwarding the N1 PCF information to the V-PCF 508 may be performed by, in some embodiments, Npcf_N1-MessageCommunication service or Namf_Notification service between the AMF 506 and the V-PCF 508.

In a sixth communication 534 from the V-PCF 508 to the H-PCF 510, the V-PCF 508 forwards the request from the AMF 506 to the H-PCF 510 in response to determining that the H-PCF 510 is to be contacted.

In various embodiments, the H-PCF 510 may obtain 536 from the UDR 512 the latest policy information for the UE 502 (e.g., subscriber). In certain embodiments, the H-PCF 510 may: forward the UE 502 policy information (e.g., contained in the N1 PCF container) received from the UE 502 to the UDR 512; or the H-PCF 510 may request download and/or retrieval of the UE 502 policy. In some embodiments, based on the UE 502 policy information (e.g., contained in the N1 PCF container) and received from the H-PCF 510, the UDR 512 may determine whether to initiate a UE 502 policy update to the UE 502 (e.g., to send or to push the UE 502 policy) or to generate a new or updated policy and to send it to the UE 502. In various embodiments, in response to the UDR 512 determining to update the UE 502 policy, the UDR 512 sends the UE 502 policy to the H-PCF 510 as a response to the indication from H-PCF 510. In certain embodiments, the UDR 512 may indicate to delete the UE 502 policy by the UDR 512 sending a "policy delete" command to the UE 502. In some embodiments, in response to the UDR 512 determining that no UE 502 policy update is needed, the UDR 512 may reply to the H-PCF 510 with information indicating that no policy update is needed. In various embodiments, the UDR 512 may indicate to delete a whole UE 502 policy or a part of the UE 502 policy. In such embodiments, the UDR 512 may send a "policy delete" command to the UE 502 including further information (e.g., which part of the policy is to be deleted).

In one embodiment, the H-PCF 510 determines 538 whether one or more new UE 502 policies are required to be delivered to the UE 502 based on the information provided by the UDR 512.

In a seventh communication 540 from the H-PCF 510 to the V-PCF 508, the H-PCF 510 provides the updated polices in a service request response. Moreover, the H-PCF 510 includes a new policy identifier and/or a freshness parameter. Accordingly, in the seventh communication 540, the H-PCF 510 sends the policies to the V-PCF 508.

In an eighth communication 542 from the V-PCF 508 to the AMF 506, the V-PCF 508 may provide the updated policies in a service request response and/or by triggering a new service towards the AMF 506 (e.g., Namf_N1Communication). In the eighth communication 542, the V-PCF 508 may include a new policy identifier and/or a freshness parameter along with the UE 502 policy. Furthermore, the V-PCF 508 may add its own polices to the policies received from the H-PCF 510 (e.g., which may include its own one or more policy identifiers and/or one or more corresponding freshness parameters). In some embodiments, the polices from the V-PCF 508 may be provided in a separate message than the polices from the H-PCF 510. In various embodiments, the UE 502 policy and corresponding parameters (e.g., policy identifier and/or freshness parameter) may be sent within a N1 PCF container to the AMF 506. This may be performed as reply to the fifth communication 532 or as an independent service procedure triggered by the V-PCF 508 towards the AMF 506. In some embodiments, such as in response to the UE 502 policy (and optionally parameters like the policy identifier and/or the freshness parameter) coming from the UDR 512, the policy and/or optional parameters may be transparent to the V-PCF 508.

The second option is described in relation to communications 544 through 558. In the second option the V-PCF 508 is subscribed to the AMF 506 to be notified in response to a UE 502 including a policy identifier and/or freshness parameters in the registration request message.

In a ninth communication 544 from the H-PCF 510 to the V-PCF 508, the H-PCF 510 may optionally subscribe to the AMF 506 to be notified of a change in a UE 502 policy. In this roaming embodiment, the H-PCF 510 may be subscribed to the AMF 506 via the V-PCF 508, accordingly, the notification to subscribe is sent from the H-PCF 510 to the V-PCF 508. In a tenth communication 546 from the V-PCF 508 to the AMF 506, the V-PCF 508 sends a notification to subscribe to changes in UE 502 policy from the AMF 506 either due to a V-PCF 508 internal trigger or due to a trigger from the H-PCF 510.

In an eleventh communication 548 from the AMF 506 to the V-PCF 508, in response to the V-PCF 508 (or the H-PCF 510) being subscribed to the AMF 506 to be notified of a change of UE 502 policy, the AMF 506 notifies the V-PCF 508 of the policy identifier included within the registration request message from the UE 502. In a twelfth communication 550 from the V-PCF 508 to the H-PCF 510, the V-PCF 508 forwards the subscription notification received from the AMF 506 in response to the H-PCF 510 being subscribed to the AMF 506.

In certain embodiments, the H-PCF 510 may obtain 552 from the UDR 512 the latest policy information for the UE 502 (e.g., subscriber). In one embodiment, the H-PCF 510 determines 554 whether one or more new UE 502 policies are required to be delivered to the UE 502 based on the information provided by the UDR 512.

In a thirteenth communication 556 from the H-PCF 510 to the V-PCF 508, the H-PCF 510 may provide the updated policies to the V-PCF 508 in a service request response. The H-PCF 510 may include a new policy identifier and/or a freshness parameter.

In a fourteenth communication 558 from the V-PCF 508 to the AMF 506, the V-PCF 508 may provide the updated policies to the AMF 506. Moreover, in the fourteenth communication 558, the V-PCF 508 may include its own UE 502 policies (e.g., in the same message, or a separate message). In various embodiments, the AMF 506 may detect 560 that a new UE 502 policy is to be sent to the UE 502. The AMF 506 may store the UE 502 policy and/or forward it to the UE 502 in response to the UE 502 entering a connected state.

In a fifteenth communication 562 from the AMF 506 to the UE 502, the AMF 506 sends a registration accept message, such as by sending a registration accept message as defined in 3GPP TS 23.502. In a sixteenth communication 564 from the AMF 506 to the UE 502, the AMF 506 may detect that the UE 502 enters a connected state and the AMF 506 may send the UE 502 policy to the UE 502, such as by sending the UE 502 policy in a generic NAS transport message. The UE 502 may store 566 the updated UE 502 policy and update its UE 502 policy identifier and/or a freshness parameter.

In one embodiment, a network may have provisioned a UE with a policy that is still fresh; however, the network may keep track of the freshness based on a UE subscription ID (e.g., based on an International Mobile Subscriber Identity "IMSI" or Subscriber Permanent Identifier "SUPI"). In some embodiments, in response to a combination UE and a SIM being new, the network may still think that UE policy is fresh (e.g., because policies have been already provided for this IMSI), but the UE may not have policies or the UE may store policy from an old SIM card. In such embodiments, it may be advantageous if the network can determine that the association between UE and the SIM has changed. Accordingly, the network (e.g., UDR or PCF) may store the UE device ID (e.g., International Mobile Equipment Identity "IMEI" or Permanent Equipment Identity "PEI") to which the UE policy has been provided. In some embodiments, during a registration procedure without an explicit policy identifier indication, the network may request the UE for the UE subscription ID (e.g. IMEI, PEI). The network may be able to determines that the SIM is used with a new UE ID (in other words the network may determine whether the combination UE and the SIM is registering for the first time). If the network determines this situation, then the network (e.g., UDR or PCF) initiates provisioning of a UE policy to the UE.

In certain embodiments, a PCF may contact a UE in order to identify the UE device capabilities before providing new and/or updated UE policies to the UE. In such embodiments, triggers for the PCF to request UE capabilities may include: an AMF has notified the PCF of a UE policy ID change; a UE initial registration; and a UDR triggers the PCF to provide new and/or updated UE policies. Accordingly, the network may obtain the UE current provisioned policy information. With this information, the PCF may determine whether to provide the UE with a new policy.

Figure 6:
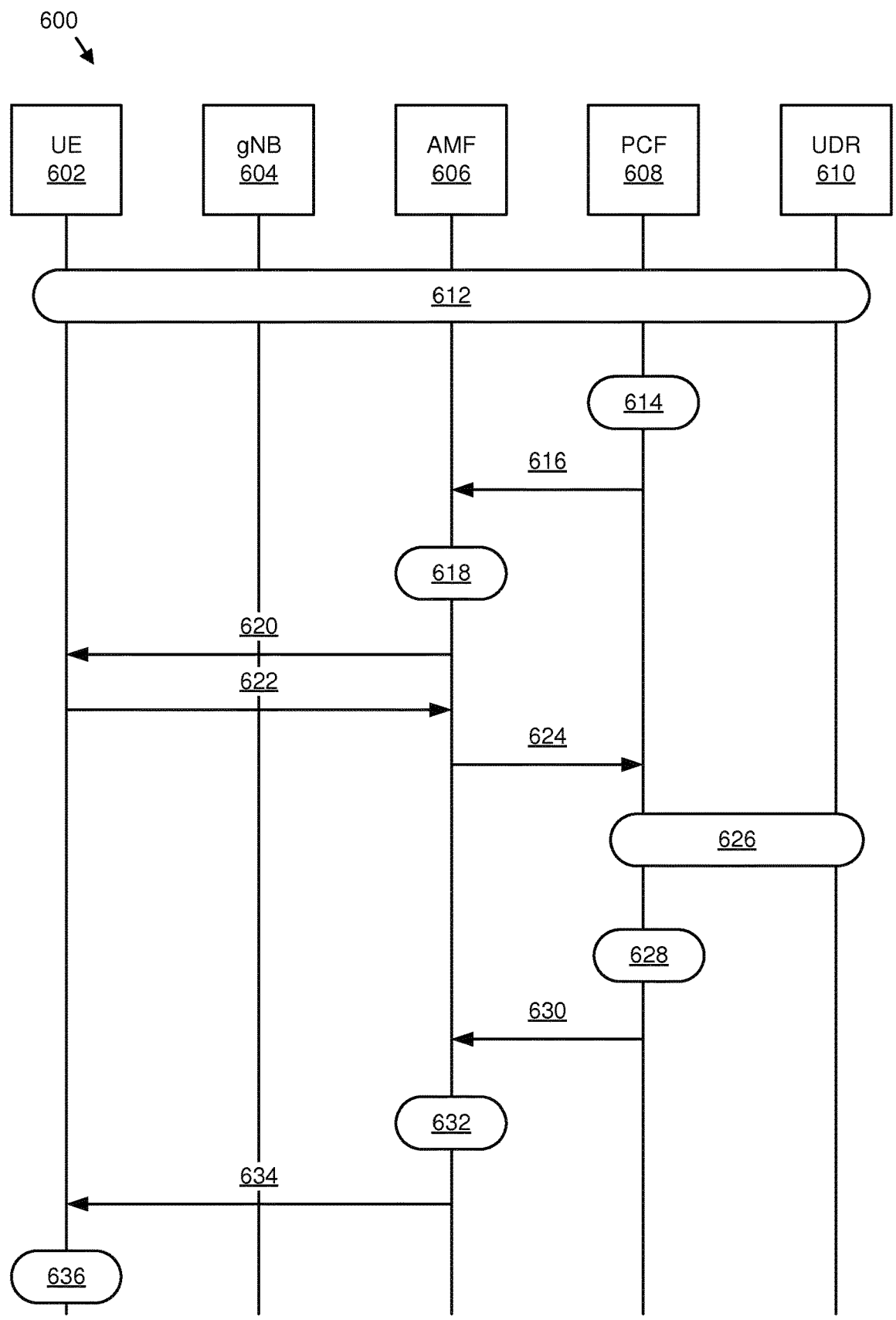
FIG. 6 illustrates a further embodiment of communications for updating a policy.

FIG. 6 illustrates a further embodiment of communications 600 for updating a policy. Specifically, communications 600 between a UE 602, a gNB 604, an AMF 606, a PCF 608, and a UDR 610 are illustrated.

In certain embodiments, the PCF 608 is notified 612 that the UE 602 has included a policy identifier in a registration request message. In some embodiments, the PCF 608 may receive new UE 602 policies from the UDR 610 or may be notified from the UDR 610 that there are updated UE 602 policies. In various embodiments, the PCF 608 may decide 614 to request the UE 602 capabilities in order to provide appropriate UE 602 policies.

In some embodiments, a first communication 616 from the PCF 608 to the AMF 606 may include the PCF 608 invoking an AMF 606 service to transmit a NAS container that includes a request to the UE 602 to provide UE capabilities. The AMF 606 determines 618 that the message is a PCF 608 related message that needs to be delivered to the UE 602.

In various embodiments, a second communication 620 from the AMF 606 to the UE 602, the AMF 606 includes the NAS container from the first communication 616 into a generic NAS message and sends this to the UE 602 in response to the UE 602 being in a connected state. In some embodiments, in response to the UE not being in a connected state the AMF 606 may wait until the UE 602 enters a connected state before sending the NAS message.

In a third communication 622 from the UE 602 to the AMF 606, the UE 602 responds within a NAS message with a UE 602 profile that includes device capabilities. Device capabilities may include: an operating system installed; device model information; and so forth. The UE 602 policy profile may be included in the NAS message within an N1 PCF container. The AMF 606 identifies the N1 PCF container and may forward it to the PCF 608 via a service based request message.

In a fourth communication 624 from the AMF 606 to the PCF 608, the AMF 606 includes the UE 602 profile in the service request response to the PCF 608. In some embodiments, the PCF 608 obtains 626 from the UDR 610 the latest policy information for this UE 602 (e.g., subscriber). The PCF 608 may also provide the UE 602 capabilities in the request to allow the UDR 610 to provide updated UE 602 policies. In certain embodiments, the PCF 608 determines whether new UE 602 polices are to be delivered to the UE 602 based on the information provided by the UDR 610.

In a fifth communication 630 from the PCF 608 to the AMF 606, the PCF 608 provides the updated policies by sending a service request message to the AMF 606. In various embodiments, the AMF 606 may detect 632 that a new UE 602 policy is to be sent to the UE 602. The AMF 606 may store the UE 602 policy and/or forward it to the UE 602 in response to the UE 602 entering a connected state.

In a sixth communication 634 from the AMF 606 to the UE 602, the AMF 606 may detect that the UE 602 enters a connected state and the AMF 606 may send the UE 602 policy to the UE 602, such as by sending the UE 602 policy in a generic NAS transport message. The UE 602 may store 636 the updated UE 602 policy and update its UE 602 policy identifier and/or a freshness parameter.

Figure 7:
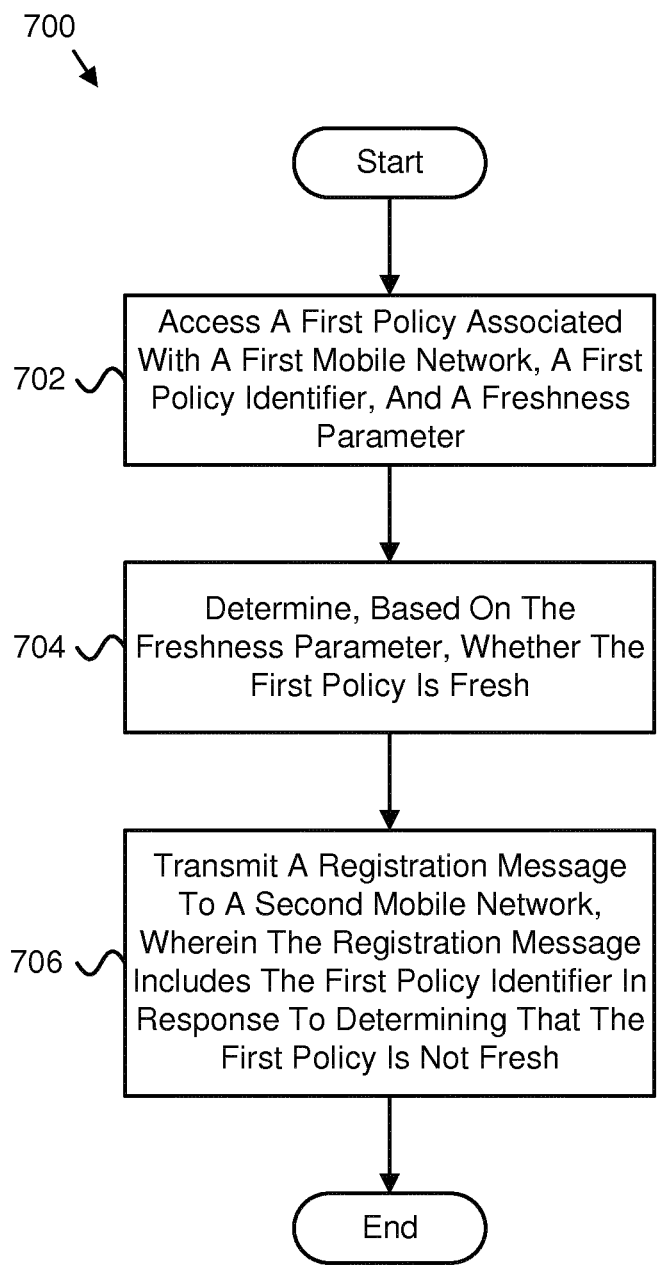
FIG. 7 is a schematic flow chart diagram illustrating one embodiment of a method for determining mobile network policy freshness.

FIG. 7 is a schematic flow chart diagram illustrating one embodiment of a method 700 for determining mobile network policy freshness. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include accessing 702 a first policy associated with a first mobile network, a first policy identifier, and a freshness parameter. In various embodiments, the method 700 includes determining 704, based on the freshness parameter, whether the first policy is fresh. In certain embodiments, the method 700 includes transmitting 706 a registration message to a second mobile network. In such embodiments, the registration message includes the first policy identifier in response to determining that the first policy is not fresh. In various embodiments, the first mobile network may be the same mobile network in which the registration message is transmitted; while in other embodiments, the first mobile network may be a different mobile network in which the registration message is transmitted.

In one embodiment, the first policy identifier indicates a version of the first policy. In a further embodiment, the freshness parameter indicates a date to check for a new policy, an expiration date for the first policy, a date the first policy is received, or some combination thereof. In certain embodiments, the method 700 includes determining to register with the second mobile network. In such embodiments, transmitting the registration message to the second mobile network is performed in response to determining to register with the second mobile network. In various embodiments, registering with the second mobile network includes initially registering with the second mobile network.

In some embodiments, registering with the second mobile network includes registering with the second mobile network to update a location of a remote unit. In various embodiments, the method 700 includes determining that there is no policy associated with the second mobile network and, in response to determining that there is no policy, transmitting the registration message with a policy identifier set to zero. In one embodiment, the method 700 includes determining whether there is a second policy corresponding to the second mobile network and, in response to determining that there is no second policy and that the first policy is fresh, transmitting the registration message with a policy identifier set to zero. In certain embodiments, the method 700 includes receiving a message following successful registration. In such embodiments, the message includes a new policy. In various embodiments, the method 700 includes receiving a message following successful registration. In such embodiments, the message includes a new freshness parameter for the first policy.

In some embodiments, the method 700 includes setting the freshness parameter for the first policy based on the new freshness parameter received for the first policy. In certain embodiments, the method 700 includes determining whether a remote unit is roaming. In various embodiments, the method 700 includes receiving a message following successful registration. In such embodiments, the message includes a new policy from the first mobile network. In one embodiment, the method 700 includes, in response to determining that the policy is not fresh, continuing to use the policy. In certain embodiments, the first mobile network is the same as the second mobile network. In various embodiments, the first mobile network is different from the second mobile network.

Figure 8:
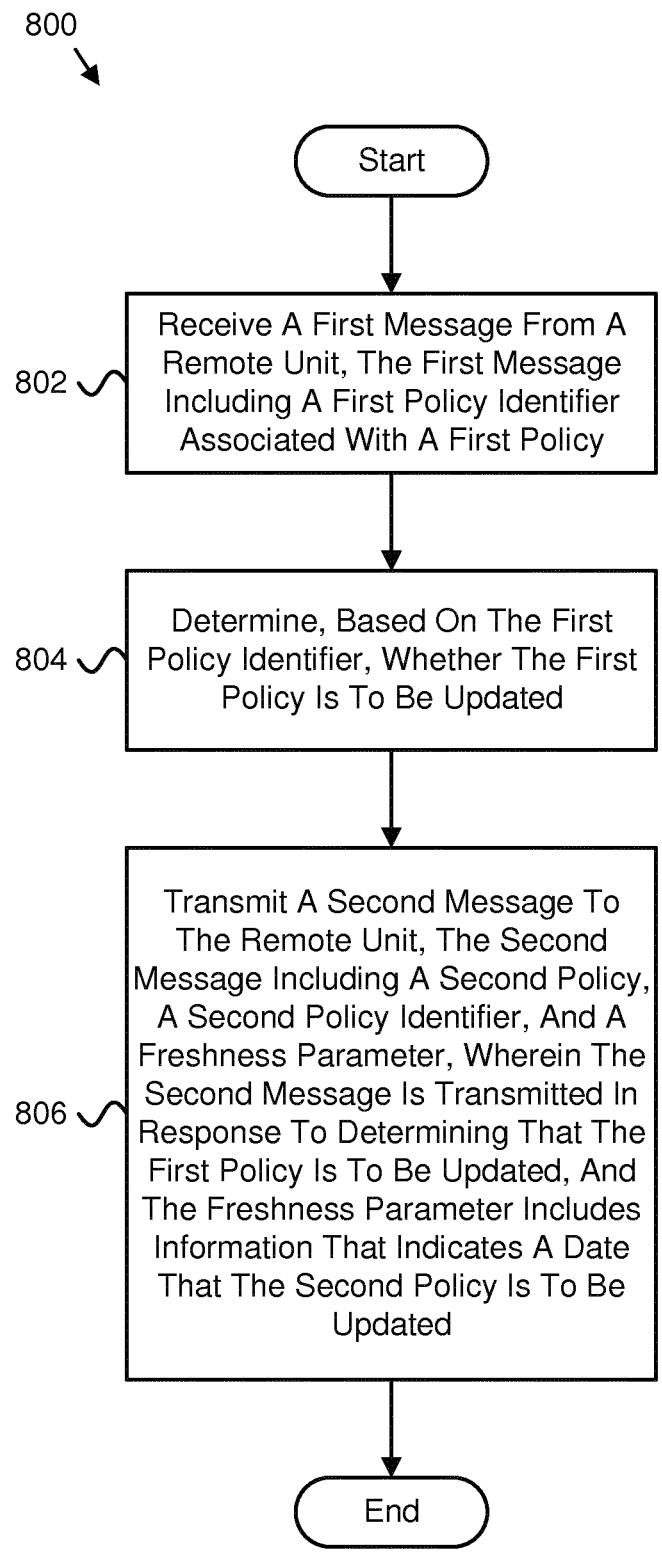
FIG. 8 is a schematic flow chart diagram illustrating one embodiment of a method for updating a policy.

FIG. 8 is a schematic flow chart diagram illustrating one embodiment of a method 800 for updating a policy. In some embodiments, the method 800 is performed by an apparatus, such as the base unit 104. In certain embodiments, the method 800 may be performed by a processor executing program code, for example, a microcontroller, a microprocessor, a CPU, a GPU, an auxiliary processing unit, a FPGA, or the like.

The method 800 may include receiving 802 a first message from a remote unit 102, the first message including a first policy identifier associated with a first policy. In various embodiments, the method 800 includes determining 804, based on the first policy identifier, whether the first policy is to be updated. In certain embodiments, the method 800 includes transmitting 806 a second message to the remote unit 102, the second message including a second policy, a second policy identifier, and a freshness parameter. In such embodiments, the second message is transmitted in response to determining that the first policy is to be updated, and the freshness parameter includes information that indicates a date that the second policy is to be updated.

In one embodiment, determining, based on the first policy identifier, whether the policy is to be updated, includes transmitting the first policy identifier to a home mobile network and receiving information from the home mobile network that indicates whether the policy is to be updated and an indication of a date that new policy data is to be requested in a subsequent registration request. In a further embodiment, the information includes the second policy with the freshness parameter associated with the second policy. In certain embodiments, determining, based on the first policy identifier, whether the first policy is to be updated, includes comparing the first policy identifier of the first policy to the second policy identifier.

In some embodiments, the method 800 includes transmitting a third message to the remote unit. In such embodiments, the third message includes an indication of a date that new policy data is to be requested in a subsequent registration request in response to determining that the first policy is not to be updated.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
    accessing, at a user equipment, a first policy associated with a first mobile network and a first policy identifier, wherein the first policy identifier indicates whether the first policy is fresh;
    determining, at the user equipment, whether the first policy is fresh based on the first policy identifier, wherein:
        it is determined that the first policy is not fresh in response to the first policy identifier indicating that the first policy is to be updated; and
        it is determined that the first policy is fresh in response to the first policy identifier indicating that the first policy is not to be updated; and
    transmitting a registration message to a second mobile network, wherein the registration message comprises the first policy identifier in response to determining that the first policy is not fresh.

2. The method of claim 1, wherein the first policy identifier indicates a version of the first policy.

3. The method of claim 1, further comprising determining to register with the second mobile network, wherein transmitting the registration message to the second mobile network is performed in response to determining to register with the second mobile network.

4. The method of claim 3, wherein registering with the second mobile network comprises initially registering with the second mobile network.

5. The method of claim 3, wherein registering with the second mobile network comprises registering with the second mobile network to update a location of a remote unit.

6. The method of claim 1, further comprising determining that there is no policy associated with the second mobile network and, in response to determining that there is no policy, transmitting the registration message without a policy identifier.

7. The method of claim 6, further comprising determining whether there is a second policy corresponding to the second mobile network and, in response to determining that there is no second policy and that the first policy is fresh, transmitting the registration message without a policy identifier.

8. The method of claim 6, wherein the first mobile network is the same as the second mobile network.

9. The method of claim 6, wherein the first mobile network is different from the second mobile network.

10. An apparatus comprising a user equipment, the apparatus further comprising:
    a processor that:
        accesses a first policy stored at the user equipment, wherein the first policy is associated with a first mobile network and a first policy identifier, and the first policy identifier indicates whether the first policy is fresh; and
        determines whether the first policy is fresh based on the first policy identifier, wherein:
            it is determined that the first policy is not fresh in response to the first policy identifier indicating that the first policy is to be updated; and
            it is determined that the first policy is fresh in response to the first policy identifier indicating that the first policy is not to be updated; and
    a transmitter that transmits a registration message to a second mobile network, wherein the registration message comprises the first policy identifier in response to determining that the first policy is not fresh.

11. The apparatus of claim 10, further comprising a receiver that receives a message following successful registration, wherein the message comprises a new policy.

12. The apparatus of claim 10, further comprising a receiver that receives a message following successful registration, wherein the message comprises a new freshness parameter for the first policy.

13. The apparatus of claim 10, wherein the processor determines whether the apparatus is roaming.

14. The apparatus of claim 13, further comprising a receiver that receives a message following successful registration, wherein the message comprises a new policy from the first mobile network.

15. The apparatus of claim 10, wherein the processor, in response to determining that the policy is not fresh, continues to use the policy.

16. A method comprising:
    receiving, at a network device, a first message from a user equipment, the first message comprising a first policy identifier associated with a first policy, wherein the first policy identifier indicates whether the first policy is fresh;
    determining, based on the first policy identifier, whether the first policy is to be updated, wherein:
        it is determined that the first policy is to be updated in response to the first policy identifier indicating that the first policy is not fresh; and
        it is determined that the first policy is not to be updated in response to the first policy identifier indicating that the first policy is fresh; and
    transmitting, from the network device, a second message to the user equipment remote unit, the second message comprising a second policy and a second policy identifier, wherein the second message is transmitted in response to determining that the first policy is to be updated, and the second policy identifier indicates whether the second policy is fresh.

17. The method of claim 16, wherein determining, based on the first policy identifier, whether the policy is to be updated, comprises transmitting the first policy identifier to a home mobile network and receiving information from the home mobile network that indicates whether the policy is to be updated.

18. The method of claim 17, wherein the information comprises the second policy with the freshness parameter associated with the second policy.

19. The method of claim 16, wherein determining, based on the first policy identifier, whether the first policy is to be updated, comprises comparing the first policy identifier of the first policy to the second policy identifier.

20. An apparatus comprising a network device, the apparatus further comprising:
  a receiver that receives a first message from a user equipment, the first message comprising a first policy identifier associated with a first policy, wherein the first policy identifier indicates whether the first policy is fresh;
  a processor that determines, based on the first policy identifier, whether the first policy is to be updated, wherein:
    the processor determines that the first policy is to be updated in response to the first policy identifier indicating that the first policy is not fresh; and
    the processor determines that the first policy is not to be updated in response to the first policy identifier indicating that the first policy is fresh; and
  a transmitter that transmits a second message to the user equipment, the second message comprising a second policy and a second policy identifier, wherein the second message is transmitted in response to determining that the first policy is to be updated, and the second policy identifier indicates whether the second policy is fresh.

* * * * *